UNITED STATES PATENT OFFICE.

RUDOLF SCHMITT, OF DRESDEN, SAXONY, ASSIGNOR TO DR. F. VON HEYDEN NACHFOLGER, OF RADEBENT, NEAR DRESDEN, GERMANY.

MANUFACTURE OF SALICYLIC-ACID COMPOUNDS.

SPECIFICATION forming part of Letters Patent No. 338,365, dated March 23, 1886.

Application filed July 13, 1885. Serial No. 171,534. (No specimens.) Patented in England July 15, 1884, No. 10,167; in Germany May 10, 1885, No. 33,635; in Luxemburg May 15, 1885, No. 533, and in Belgium May 18, 1885, No. 68,902.

*To all whom it may concern:*

Be it known that I, RUDOLF SCHMITT, a subject of the Emperor of Germany, residing at Dresden, in the Kingdom of Saxony, Germany, have invented a new and useful Improvement in the Manufacture of Salicylic-Acid Substitutes, (for which I have obtained Letters Patent of Great Britain, No. 10,167, dated July 15, 1884; a patent of addition of the German Empire, No. 33,635, dated May 10, 1885; a brevet de perfectionment of the Kingdom of Belgium, No. 68,902, dated May 18, 1885, and a patent of addition of Luxemburg, No. 533, dated May 15, 1885,) of which the following is a specification.

This invention relates to the manufacture of salicylic-acid substitutes by first exposing the substitute phenolates of the alkaline and earthy alkaline salts, especially the substitute halogenized phenolates, to the action of carbonic acid, and by then heating these substitute phenolates in an autoclave to about from 120° to 140°. This process may be considered as an extension of the process for manufacturing salicylic acid which is the subject of United States Letters Patent granted to me on January 12, 1886, No. 334,290, according to which the alkaline and earthy alkaline salts of acid phenyl carbonic ether become when heated to about from 120° to 140° directly converted quantitatively into normal salicylic salts without any separation of the phenol. In this manner it has become possible to produce for the first time one molecule of salicylic acid from one molecule of phenol.

Now, in order to explain the production of the salicylic-acid substitutes according to my process, I will proceed to describe the process with reference to the production of salicylic-acid chloride (chlorsalicylsäure) from the substitute phenolate—viz., phenol chloride, (chlorphenol) while the manufacture of two other salicylic-acid substitutes, the salicylic-acid bromide (bromsalicylsäure) and the salicylic-acid iodide (iodsalicylsäure) from the respective substitute phenolates, viz., phenol bromide (bromphenol) and phenol iodide (iodphenol,) will only be indicated by the chemical equations at the end of the description. The process in the three instances is exactly the same.

The manufacture of the salicylic-acid substitute according to this invention is as follows:

First. The dry substitute phenolate or phenolates of the alkalies or of the earthy alkalies (phenol chloride) are exposed at the ordinary temperature to the action of dry carbonic acid until absorption takes place and there is formed quantitatively the substitute alkaline or the substitute earthy alkaline salt of the acid carbonic phenyl ethers, phenyl-chloride carbonate in particular being produced from the phenol chloride (I.) 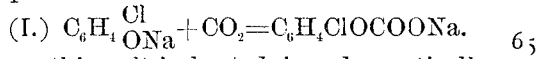

When this salt is heated in a hermetically-closed vessel or digester to from 120° to 140° centigrade for a few hours, the molecular transformation into the substituted simple salicylic salt proceeds quantitatively without separation of phenol, the phenyl chloride carbonate in particular being transformed into salicylic chloride according to the following equation:

(II.) 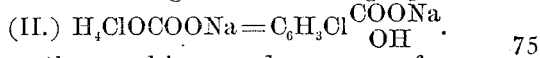

When the vessel is opened, no excess of pressure is present. The perfectly-dry salicylic-chloride salt is then dissolved in water, the substituted salicylic acid precipitated by a mineral acid, and purified by crystallization in the usual manner.

Second. The substituted phenolate or phenolates of the alkalies and of the earthy alkalies is or are rapidly dried and placed in a vessel provided with a tight-fitting cover, (autoclave,) and dry carbonic acid is pumped or introduced into it, preferably by means of a force-pump, so long as may be necessary to form the substituted phenyl carbonic salts. The vessel should be kept well cooled during this pumping or forcing operation. The vessel is kept closed as long as the carbonic acid is not perfectly absorbed and any excess of pressure is present. The mass is then allowed to stand for a few hours, in order to admit of the complete conversion of the substituted phenolate in the substituted phenyl carbonic salts. The vessel is then heated in an air-bath for a few hours to from about from 120° to 140° centigrade, in order to effect the conversion into normal substituted salicylic acid or salts.

Third. The dry substituted phenolate is placed in a vessel with an air-tight cover, and a sufficient quantity of solid carbonic acid is introduced to form the substituted phenyl carbonic salt. The apparatus is then quickly closed and treated as hereinbefore described with reference to operation No. 2. The homologues of the substituted acid are produced in the same manner.

The vessels employed in carrying out the second and third operations, hereinbefore described, are preferably provided with the arrangement employed in Natterer's apparatus for condensing carbonic acid.

The equations for the process of the manufacture of other substitute salicylic acids are, as stated above, of the same type. When salicylic-acid bromide is to be produced from phenol bromide the equations of the process are as follows:

(I.) $C_6H_4{}^{Br}_{ONa} + CO_2 = C_6H_4BrOCOONa$,

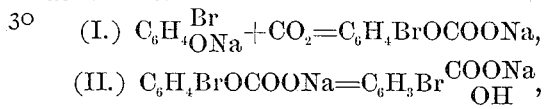

(II.) $C_6H_4BrOCOONa = C_6H_3Br{}^{COONa}_{OH}$, while when salicylic-acid iodide shall be produced the transformation is as follows:

(I.) $C_6H_4{}^{J}_{ONa} + CO_2 = C_6H_4JOCOONa$, (II.) $C_6H_4JOCOONa = C_6H_3J{}^{COONa}_{OH}$.

In each of these cases the pulverent substituted salicylic salt is then dissolved in water, the salicylic acid precipitated by a mineral acid and crystallization in the usual manner.

I claim—

The process of obtaining salicylic-acid substitutes, which consists in first treating the substituted phenolates of the alkalies and of the earthy alkalies with dry carbonic acid for the production of substituted phenyl carbonic alkalies and earthy alkalies, and afterward treating the salts thus formed in a hermetically-closed apparatus from about 120° to about 140° centigrade for their conversion into substituted salicylic salts without any separation of phenol, substantially as specified.

In testimony that I claim the foregoing as my invention I have signed my name hereto in presence of two subscribing witnesses.

RUDOLF SCHMITT.

Witnesses:
PAUL DRUCKMÜLLER,
CARL SCHRÖDER.